Figure 6:
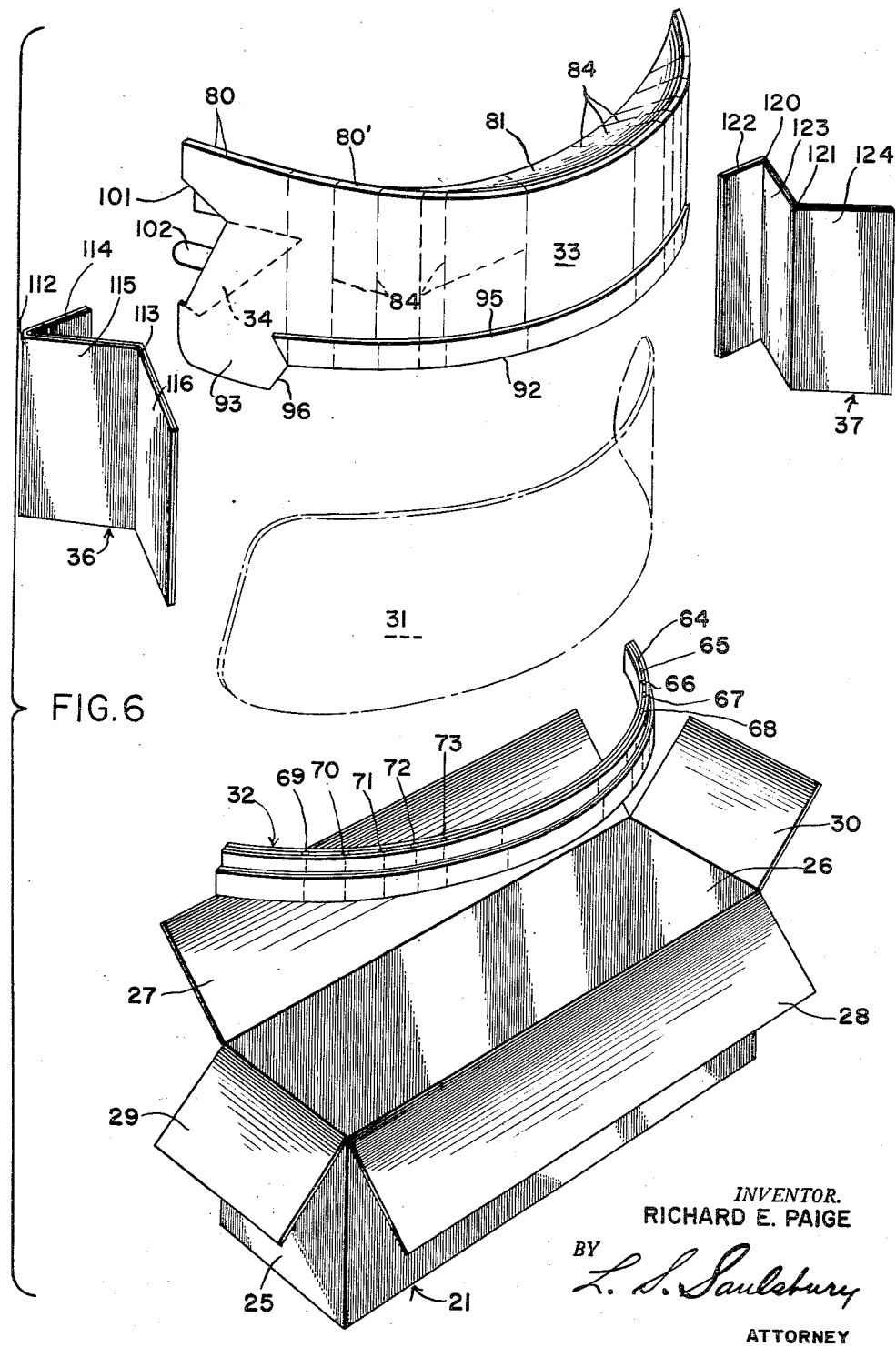

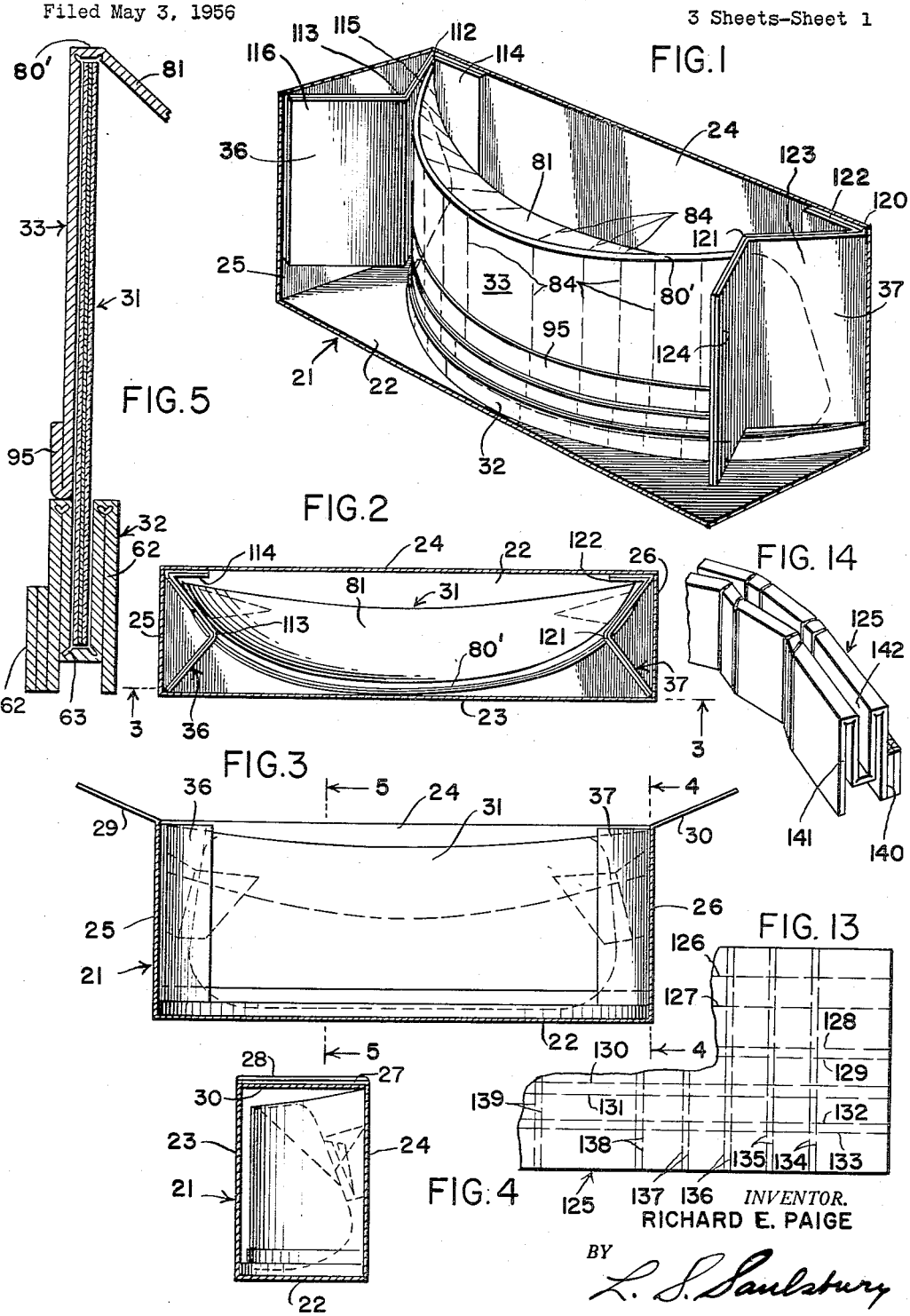

July 1, 1958  R. E. PAIGE  2,841,277
WINDSHIELD SHIPPING CARTON ASSEMBLY
Filed May 3, 1956  3 Sheets-Sheet 3
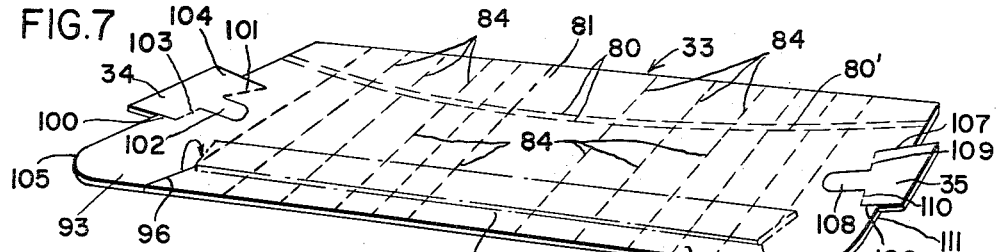
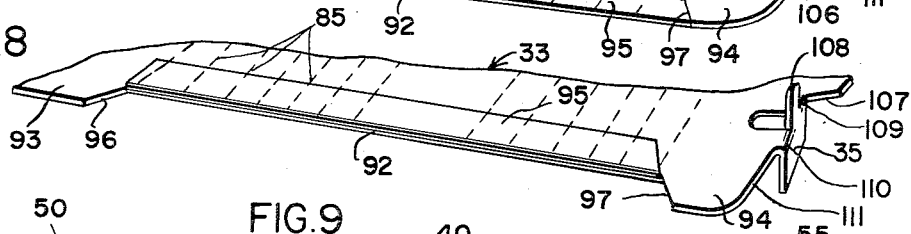
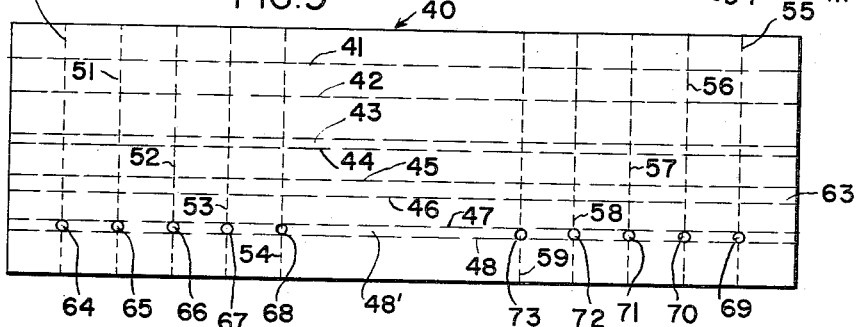
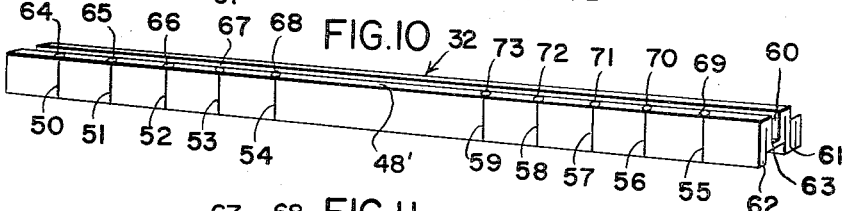
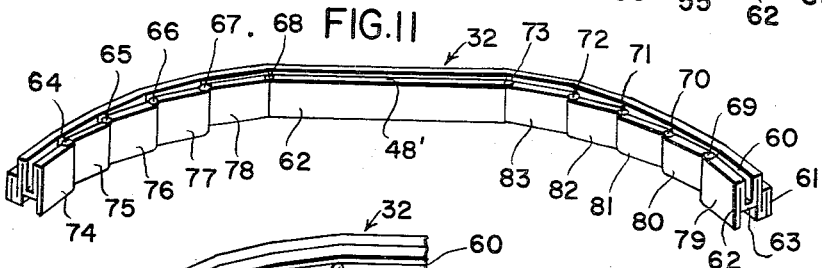
*INVENTOR.*
RICHARD E. PAIGE
BY
L. S. Saulsbury
ATTORNEY

United States Patent Office 2,841,277
Patented July 1, 1958

2,841,277
WINDSHIELD SHIPPING CARTON ASSEMBLY
Richard E. Paige, New York, N. Y.

Application May 3, 1956, Serial No. 582,389

12 Claims. (Cl. 206—62)

This invention relates to shipping cartons and more particularly to cartons adapted for the shipment of curved automobile windshields and the like.

It is an object of the present invention to provide a curved automobile windshield shipping carton wherein the windshield will be firmly held within the carton against any sliding movement such as would render a blow that would break or snap the curved rounded ends of the windshield.

It is another object of the invention to provide supporting runners which are formed of corrugated cardboard material that is bent and curved to the shape of the lower and upper edges of a wrap-around type of windshield so as to contain these edges throughout the full extent thereof within the shipping carton and wherein the parts can be interlocked with one another and sustained and braced within the carton by simple end members slide fitted downwardly into the carton so as to prevent lateral as well as longitudinal movement of the windshield therewithin and to adequately cover, brace and retain the windshield in the carton.

It is still another object of the invention to provide a curved runner for use in retaining curved articles of the nature of windshields within a carton which is in the form of a channel and yet bent at its end to provide a continuous curved channel end for the reception of the curved ends of the bottom edge of the article and wherein the curving of the runners to uniformly conform to the curved ends of the windshield is effected by weakening one side of the folded channel to allow portions separated by the openings to override one another to shorten thereby the face of the runner and permit for the curvature thereof in a gradient and precise manner.

It is still another object of the invention to provide in a shipping carton assembly for windshields, cut away portions at the ends of the top cover which can be pivoted outwardly thereof to extend around the end of the windshield and engage with the rear face thereof and with a projection engageable by a bracing member that is inserted in the end of the carton to sustain the cut away portion in position against the underface of the end of the windshield.

Further objects of the invention are to provide a shipping carton assembly for automobile windshields and the like, having the above objects in mind, which is of simple construction, has a minimum number of parts, inexpensive to manufacture, compact, durable, provides for a rigid protective assembly of corrugated carton material, easy to assemble with the windshield, of pleasing appearance, efficient and effective in use.

For still further objects and for a better understanding of the invention, reference may be had to the following detailed description taken in connection with the accompanying drawing, in which Figure 1 is a perspective view of the parts of the bracing member in assembled relation within the carton, but with portions of the carton being broken away to look upon the assembly, Fig. 2 is a transverse horizontal sectional view taken through the carton and looking downwardly in plan from the assembly within the carton, Fig. 3 is a front elevational view of the assembly within the carton with the front side of the carton removed to look in elevation upon the assembly within the carton, the view being taken generally on line 3—3 of Fig. 2, Fig. 4 is an end elevational view of the assembly with the end of the carton removed and looking in elevation upon the ends of the bracing members, the view being taken generally on line 4—4 of Fig. 3, Fig. 5 is an enlarged sectional view taken through the windshield and the upper and lower protecting runners, the view being taken on line 5—5 of Fig. 3, Fig. 6 is an exploded perspective view of the carton, upper and lower protecting runners and bracing members removed therefrom with the windshield being shown in phantom, Fig. 7 is a perspective view of the upper cover protecting runner in its unfolded state with illustration made as to the manner in which it is to be folded, Fig. 8 is a fragmentary perspective view looking along the bottom edge and one end of the upper cover runner with the parts folded at the bottom and at one end, Fig. 9 is a plan view of the corrugated cardboard blank from which the lower channel, protecting runner is made, Fig. 10 is a perspective view of the lower folded channel runner in its extended form and before the ends have been curved or broken to conform to the shape of the curved lower edge of the windshield, Fig. 11 is a perspective view of the folded lower channel runner after the ends have been broken and curved, Fig. 12 is a fragmentary top plan view of the curved end of the lower folded channel runner showing the broken sections weakened by the top holes, Fig. 13 is a fragmentary plan view of one end of a corrugated cardboard blank of a modified form of a lower folded channel runner in which double scoring lines are used for weakening purposes, and Fig. 14 is a fragmentary perspective view of one end of the modified channel runner folded lengthwise and bent on its double scoring lines to provide the final curved end shape.

Referring now to the figures, 21 represents an elongated corrugated cardboard carton having a bottom 22, elongated sides 23 and 24, ends 25 and 26, foldable side flaps 27 and 28, and foldable end flaps 29 and 30. This carton is of such shape and size as to contain a windshield against movement within the carton and to protect the edges and ends thereof. There has been provided four principal members that are interfitted together and braced within the corners of the carton so that the entire assembly including the windshield is locked rigidly within the carton. The windshield is thereby held in tight assembled relationship and against any longitudinal displacement therewithin. This assembly generally comprises a lower curved supporting channel runner or member 32 for receiving the lower edge of the windshield 31, an upper cover runner or member 33 adapted to extend over the top edge of the windshield and having end flap portions 34 and 35 which are folded about the ends of the windshield and vertically folded end bracing members 36 and 37 tightly fitted between the corners in the end of the carton and the folded ends of the upper cover member 33.

The lower curved supporting channel runner or member 33 is formed from a blank 40 of elongated rectangular shape in plan as shown in Fig. 9 and which is scored longitudinally along a plurality of parallel scoring lines 41, 42, 43, 44, 45, 46, 47 and 48 and transversely across the opposite ends along a plurality of parallel scoring lines 50, 51, 52, 53, 54 and 55, 56, 57, 58, 59. This channel member 33 is folded along its longitudinal scoring lines so as to provide a shape such as shown in Fig. 10 with an elevated channel groove 60 running throughout the length of the channel member and depending leg assemblies 61 and 62 on the opposite sides thereof and with an elevated groove bottom 63 lying therebetween. The leg assembly 61 has four layers of corrugated stock material that forms the outer side of the finally curved member 32 and the leg assembly 62 has two layers thereof that forms the inner side of the curved member 32. Running between the longitudinal scoring lines 47 and 48 is a narrow portion 48′ in which a plurality of weakening holes 64, 65, 66, 67 and 68 are made respectively at the transverse lines 50, 51, 52, 53 and 54 and at the opposite end of the member in which a plurality of weakening holes 69, 70, 71, 72 and 73 are made at the transverse lines 55, 56, 57, 58 and 59. The leg assembly 62 forms the inner face of the lower curved channel member 37 and must be shortened in order to permit the even and uniform bending of the ends of the channel member 32. Accordingly, the weakening holes 64, 65, 66, 67, 68, and 69, 70, 71, 72, 73 will permit an even breaking and setting back of sections 74, 75, 76, 77 and 78 at one end of the channel member and sections 79, 80, 81, 82 and 83 at the opposite end of the channel member as best shown and illustrated in Figs. 11 and 12. When this channel member 32 is so bent at its ends, the groove 60 will be shaped to and adapted to receive the curved lower edge of the curved windshield. When the curved channel member 32 is lowered onto the bottom 22 of the carton 21, it will support the windshield in a position spaced from the bottom of the carton in a rigid and fixed manner by the depending legs 61 and 62 of the channel member. The windshield will also be held spaced from the top sides, ends and corners of the carton.

The top folded cover member 33 is formed from a cut blank of corrugated cardboard, such as shown in Fig. 7. This blank has top longitudinally-extending, downwardly-curved, double scoring lines 80 conforming to the curved upper edge of the windshield to provide a narrow circumflexed portion 80′ thereover as a top shield portion 81 is folded down to have the position shown in Figs. 1 and 6 to overlie the curved upper edge and inner side of the windshield. A plurality of transverse scoring lines 84 extend across each end of the blank. These scoring lines further facilitate and make easy and possible the uniform bending of the top cover member into the shape as shown in Fig. 6. Parallel to the lower edge of the top cover and elevated thereabove is a scoring 92. This scoring extends between depending tuck portions 93 and 94. The scoring 92 provides for a flap 95 which can be folded in the manner shown in Fig. 8 between cut slits 96 and 97.

This folded flap provides a double and reinforced bottom edge that is adapted to rest on the top of the leg assembly 61 of the curved channel member 32 to equalize the extent to which the tuck portions 93 and 94 extend in the groove 60 of the channel member 32 and thereby to evenly support the top cover member 33 upon the channel member 32.

The end flap portion 34 is provided by cuts 100 and 101 and by a cut tab 102. Between the cuts 100 and 101 and the tab 102 are scorings 103 and 104 along which the end flap portion 34 can be hinged so as to be extended around the end edge of the windshield to enclose the same and to lie against the inner face thereof. This flap will thus partially enclose the end edge of the windshield to give further support to the same and end edge 105 of the cover will keep the end edge of the windshield spaced from the corner of the carton when assembled in the manner as shown in Fig. 1.

The end flap portion 35 is similarly disposed between slits 106 and 107 and has a tab 108. This end flap 35 is foldable along score lines 109 and 110 as illustrated best in Fig. 8. This end flap 35 will extend around the opposite end edge of the windshield to enclose the same and will lie against the inner face thereof. Opposite end edge 111 of the cover member 33 will overlie the end edge of the windshield and will keep it spaced from its corner of the carton.

The end bracing member 36 engages the tab 102 and thereby retains the flap 34 closed about the end of the windshield and will brace the assembled parts and the windshield against displacement in the one end of the carton. The end bracing member 37 engages tab 108 and thereby retains the flap 35 closed about the other end of the windshield and will brace the assembled parts against the displacement in the other end of the carton.

The end bracing member 36 has fold lines 112 and 113 to provide a short panel 114 adapted to lie against the side portion 24 of the carton 21, a large panel 115 adapted to lie along the outer face of the cover member 33 and against the tab 102 of the end flap 34 and a large panel 116 adapted to extend into the front corner of the carton so that its edge will lie therein to hold the panels and the fold line 113 extended toward the end of the cover member 33 in tight fitting bracing engagement therewith.

The end bracing member 37 has fold lines 120 and 121 to provide for a short panel 122 adapted to lie against the side portion 24 of the carton 21, a large panel 123 adapted to lie along the outer face of the cover member 33 and against tab 108 of the end flap 35 and a large panel 124 adapted to extend into the front corner of the carton so that its edge will lie therein to hold the panels and the fold line 121 extended toward the end of the cover member 33 in bracing engagement therewith. In this manner the opposite end of the windshield and assembled parts are held in spaced relationship from the end portion 26 of the carton.

In Figs. 13 and 14, there is shown a bottom channel member 125 having longitudinally-extending scoring lines 126, 127, 128, 129, 130, 131, 132 and 133 and double transverse scoring lines 134, 135, 136, 137 and 138 at each opposite end of the blank channel member 125 and transverse scoring lines 139 at the middle thereof. The blank piece is folded along the longitudinally-extending lines to provide the channel piece shape shown in Fig. 14 having a four-ply front leg assembly 140 and a two-ply leg assembly 141 and a channel groove 142 lying therebetween. The blank corrugated cardboard is preferably cut along the lines 126 and 127 and respectively on opposite sides thereof so that the folded panels of the leg assembly 140 may lie flush upon one another. As the bottom channel member is bent to provide the curved ends, the member will break evenly and throughout spaced locations so that the leg assembly 141 and the inner side of the channel member can be collapsed and reduced in length and the leg assembly 140 and the outer side extended.

In assembling the windshield 31 and the several members within the carton 21, the top flaps 27, 28, 29 and 30 are opened as shown in Fig. 6. The lower channel member is placed upon the bottom 22 of the carton in curved form and thereafter the windshield is placed into the carton with its lower edge fitted into the channel groove of the channel member.

The bottom channel members 32 or 125 have multiple vertical layers of heavy corrugated cardboard that can be easily flexed into the desired shape to provide a curved groove adapted to receive the curved bottom edge of the windshield. This has been made possible by the transverse scorings and by the weakening holes 64 to 73 of the channel member 32 and by the double transverse scorings of the channel member 125, and the shortening of the inner leg assemblies as the ends of the channel members are bent to the desired curved shape. Without these scorings and holes the flexing of the channel members in the proper manner would be practically impossible and still provide for an even and uniform channel groove conforming to the lower edge of the windshield.

With the windshield in place upon the lower channel member, the cover member 33 is extended downwardly over the windshield so that its tuck portions 93 and 94 are fitted into the ends of the channel groove. The flap portions 34 and 35 are folded about the ends of the windshield so that the tabs 102 and 108 will lie substantially parallel to the outer end sides of the cover member. Thereafter, the end bracing members 36 and 37 are slid downwardly into a tight fitting and wedging manner in the end portions of the carton so that the assembly is firmly braced in the ends of the carton and the windshield held in tight spaced relationship from the carton wall portions with all edges of the windshield protected and spaced upon the portions of the carton. The top flaps 27, 28, 29 and 30 of the carton can thereafter be folded in and secured together in the usual manner by sealing tape.

It should be apparent that there has been provided by this invention a unique method of making a form fitting channel to receive the lower edge of the windshield. Corrugated cardboard is rigid and stiff material and in order to have this material for the protection of the windshield and at the same time have it so as to conform in shape to the curvature of the windshield, this unique way of folding and shaping the material has been worked out.

It should also be apparent that the top cover is made of similar rigid corrugated cardboard and that it has been carefully treated and worked out so that it can be folded and curved to conform to the upper edge of the windshield and provide a cover that is circumflexed and curved and adapted to remain in shape in a self-supporting manner. This shaping of relatively rigid corrugated material has been made possible by scoring surfaces of the material and finally flexing the same over the curved scorings thereof in order to get the desired curved shape.

It will be apparent that the labor involved in so assembling this windshield into the carton is kept to a minimum and can be done quickly without need for numerous operations and without loose materials. The members which are used can be stored in a flat condition prior to their use so that they consume little space.

While various changes may be made in the detail construction, it shall be understood that such changes shall be within the spirit and scope of the present invention as defined by the appended claims.

What is claimed is:

1. A curved glass shipping carton assembly comprising an elongated carton having bottom, top, side and end portions and spaced corners, a curved bottom channel supporting member disposed upon the bottom of the carton and having its ends respectively extended toward corners at the same side of the carton and in the respective opposite ends thereof, said curved bottom channel supporting member having a channel groove, a curved glass windshield or the like having curved bottom and top edges and vertical side end edges, said windshield having its curved bottom edge lying in the channel groove of the bottom channel supporting member, a circumflexed top cover member fitted over the top edge of the curved glass windshield and running co-extensively with the bottom channel supporting member, and end bracing members overlying the ends of said bottom channel member and the cover member and tight fitted into the end corners of the carton, said circumflexed top cover having a lower edge supported upon the bottom channel supporting member whereby the windshield will be completely protected along the bottom, top and vertical side end edges thereof and the entire assembly of the windshield, the bottom channel member, the cover member and end bracing members will be braced against displacement within the carton.

2. A shipping carton assembly as defined in claim 1, and said cover member having tuck portions extending from its lower edge and into the groove of the channel member in tight fitting engagement therewith.

3. A shipping carton assembly as defined in claim 1, and end flap portions struck from the ends of said cover member and extended about the vertical side end edges of said windshield or the like.

4. A shipping carton assembly as defined in claim 3, and said end flaps having tabs extending therefrom and engageable by said end bracing members to positively hold and lock the end flaps against displacement from the end edges of the article.

5. A shipping carton assembly as defined in claim 2, and an intermediate folded up flap running along the lower portion of said cover member intermediate the tuck portions and adapted to provide a double thickness bottom edge for engagement with the top edge of the channel member to limit and equalize the amount of the downward extension of the tuck portions within the channel groove.

6. A shipping carton assembly as defined in claim 1, and said cover member having a downwardly curved double scoring lines at the top thereof with a narrow curved portion therebetween that overlies the upper edge of the windshield and a circumflex portion extending from the narrow curved portion to maintain the curved shape of the upper edge of the cover member.

7. A shipping carton assembly as defined in claim 1, and said bottom channel member being formed of a blank piece having a plurality of longitudinally-extending scoring lines and a series of transverse scoring lines, said blank piece being folded and bent along said longitudinally-extending and transverse scoring lines, said bottom channel member having multiple vertical layer leg assemblies on the inner and outer sides thereof, said inner leg assembly having weakening holes running therealong at the transverse scorings to permit sections disposed between the holes to be collapsed and the shortening of the inner leg portion as the ends of the bottom channel member are bent into the desired curved shape so that the channel groove may receive the lower curved edge of the windshield and the bottom portion of said groove being held in an elevated position upon said legs.

8. A shipping carton assembly as defined in claim 1, and said bottom channel member being formed of a blank piece having a plurality of longitudinally-extending scoring lines and a series of double transverse weakening scoring lines at the opposite ends thereof, said blank piece being folded and bent along said longitudinally-extending and transverse scoring lines, said double transverse scoring lines permitting the collapse and extension of leg assemblies as the ends of the bottom channel member are bent into the desired curved shape so that the channel groove may receive the lower edge of the said windshield.

9. A shipping carton assembly as defined in claim 1, and said bottom channel member being formed of a blank piece having a plurality of spaced longitudinally-extending scoring lines, said blank piece being folded along said scoring lines to provide multiple vertical layer leg assemblies on the opposite sides of the channel groove, and the scoring line between layers of at least one of the assemblies being cut on one face of the piece to weaken the fold therebetween and to allow the layers to lie in flush engagement with one another.

10. A packing assembly for the shipping of a sheet of curved glass, comprising a rectangular-shaped carton, an elongated bottom channel member of corrugated paper board lying in the bottom of said carton having longitudinally-extending score lines, said channel member being folded to provide a vertically-extending multi-layered strip and a center channel groove raised off the level of the bottom edge of the member, a curved glass sheet having curved upper and lower edges, the curved lower edge being supported in the center channel groove of the channel member, said channel member having a plurality of score lines running across the channel-forming score lines to permit the otherwise rigid channel member to conform to the curved lower edge of the glass sheet, a circumflexed protective covering piece of corrugated paper board comprising a generally rectangular blank having a wide curved scoring traversing the length of the rectangular blank from end to end and a plurality of score lines extending transversely across the curved scoring to permit the otherwise rigid corrugated paper board to form-fit the curved upper edge of the glass sheet and two end bracing pieces for protecting the glass sheet from end blows, each end bracing piece comprising a tent-shaped structure having side edges braced into the corners of one end of the shipping carton and additional hingedly connected panel folded off one side edge of the tent shape structure to protect the end edge of the glass sheet from a possible direct blow, said tent structure being positioned in the shipping carton to press the same against the circumflexed cover of the four-piece assembly.

11. A piece of interior packing for receiving and supporting a sheet of curved glass, comprising a U-shaped channel of folded corrugated board, two depending leg panel assemblies longer than the walls of the channel and hingedly depending from the top edges thereof, other alternately folded panels extending from the bottom edge of one of the leg assemblies to form a cushioning strip running along the exterior of the leg assembly and a plurality of wide scorings crossing the channel making folds from edge to edge and the otherwise rigid channel being bent on these lines and thereby providing step like formations as it curves about a broad arc to receive and form-fit the sheet of curved glass, said cushioning strip being formed upon the outer side of the piece so that the curved glass will be spaced along its vulnerable lower edge from the side of the shipping carton.

12. A top piece of interior packing for a sheet of curved glass formed of a generally rectangular blank of corrugated board having a wide curved scoring running from one end to the other end thereof, said blank having further a plurality of score lines crossing transversely the curved scoring and running from one side edge to the other side edge, said blank further having small end flaps scored to fold over the ends of the glass sheet and prevent lateral movement of the sheet within the carton and protect the end edges of the glass sheet, said blank folding simultaneously on all transverse and curved score lines to provide thereby a broad arcuate tent-like structure.

References Cited in the file of this patent

UNITED STATES PATENTS

| | | |
|---|---|---|
| 1,783,570 | Hill | Dec. 2, 1930 |
| 2,740,518 | Kincaid | Apr. 3, 1956 |
| 2,769,534 | Lidgard | Nov. 6, 1956 |